US011974372B2

(12) United States Patent
Harmon et al.

(10) Patent No.: US 11,974,372 B2
(45) Date of Patent: Apr. 30, 2024

(54) IN-TANK ILLUMINATION SYSTEM AND METHOD

(71) Applicant: DEERE & COMPANY, Moline, IL (US)

(72) Inventors: Andrew W. Harmon, Davenport, IA (US); Robert T. Casper, Davenport, IA (US); Peter R. Nedved, Coal Valley, IL (US)

(73) Assignee: DEERE & COMPANY, Moline, IL (US)

( * ) Notice: Subject to any disclaimer, the term of this patent is extended or adjusted under 35 U.S.C. 154(b) by 179 days.

(21) Appl. No.: 16/892,584

(22) Filed: Jun. 4, 2020

(65) Prior Publication Data

US 2021/0136896 A1    May 6, 2021

Related U.S. Application Data

(60) Provisional application No. 62/928,632, filed on Oct. 31, 2019.

(51) Int. Cl.
| | | |
|---|---|---|
| *H05B 47/105* | (2020.01) | |
| *G01F 1/20* | (2006.01) | |
| *G01F 22/02* | (2006.01) | |

(52) U.S. Cl.
CPC ............. *H05B 47/105* (2020.01); *G01F 1/20* (2013.01); *G01F 22/02* (2013.01)

(58) Field of Classification Search
CPC ......... H05B 47/105; G01F 1/20; G01F 22/02; G01F 23/02; G01F 23/185; B60P 3/228;

(Continued)

(56) References Cited

U.S. PATENT DOCUMENTS

| 3,882,887 A | 5/1975 | Rekai |
|---|---|---|
| 8,354,927 B2 | 1/2013 | Breed |

(Continued)

FOREIGN PATENT DOCUMENTS

| CN | 103603029 A | 2/2014 |
|---|---|---|
| EP | 2883950 A1 | 6/2015 |
| KR | 20180056887 A | 5/2018 |

OTHER PUBLICATIONS

Extended European Search Report and Written Opinion issued in European Patent Application No. 20202461.8, dated Mar. 19, 2021, in 8 pages.

*Primary Examiner* — Minh D A
(74) *Attorney, Agent, or Firm* — Taft Stettinius & Hollister LLP; Stephen F. Rost

(57) ABSTRACT

An in-tank illumination system and method for a translucent tank with sensors configured to monitor conditions of the tank and material inside. The illumination system includes an illumination source that illuminates the tank interior and is visible outside; and a controller that determines tank conditions based on the sensor readings, and sends control signals to the illumination source. When the controller detects a tank condition, it sends control signals to the source to illuminate the tank to indicate the tank condition. The system can include a bracket connecting the source to the tank interior near the top. The controller and source can be on different vehicles. Different control signals can change colors, blink patterns, and other properties of the source to indicate different tank conditions. The tank conditions can have different priorities to select which to indicate. The severity or duration of tank conditions can also be indicated.

11 Claims, 6 Drawing Sheets

(58) Field of Classification Search
CPC .......... F21L 2/00; F21S 41/285; F21S 41/50; G05D 9/12
See application file for complete search history.

(56) References Cited

U.S. PATENT DOCUMENTS

| | | | |
|---|---|---|---|
| 8,504,294 B2 | 8/2013 | Humphrey | |
| 2003/0169588 A1* | 9/2003 | Kohn | F21V 33/0088 |
| | | | 362/253 |
| 2006/0290722 A1* | 12/2006 | Kitagawa | B41J 2/1752 |
| | | | 347/7 |
| 2008/0247153 A1* | 10/2008 | Groover | F21V 33/00 |
| | | | 362/101 |
| 2018/0335297 A1* | 11/2018 | MacLean | G01J 1/44 |
| 2019/0009710 A1* | 1/2019 | Salter | B60N 3/104 |

\* cited by examiner

IN-TANK ILLUMINATION SYSTEM AND METHOD

FIELD OF THE DISCLOSURE

The present disclosure relates to translucent or transparent tanks, and more specifically to the illumination of translucent or transparent tanks.

BACKGROUND

Tanks are used in many applications to carry materials and it is often beneficial to know the level of material, internal pressure, flow of material or other parameters of a tank. Prior systems have used indicator lights on control panels or attached to the sides of the tanks to indicate relevant parameters. Sometimes an operator or other concerned user is not in a position to easily view the indicator lights even though they can see the tank itself. It would be desirable to illuminate the tank itself to indicate relevant parameters. In-tank illumination can add better general visibility and better night visibility of the indications. The in-tank lighting can change color, blink pattern, brightness or other properties based on sensor inputs to provide different or more detailed information.

SUMMARY

An in-tank illumination system is disclosed for a translucent tank with one or more sensors. The translucent tank has an interior configured to hold material, and the sensors are configured to monitor conditions of the translucent tank and the material. The in-tank illumination system includes an illumination source and a controller. The illumination source is configured to illuminate the interior of the translucent tank such that the tank illumination is visible outside of the tank. The controller is configured to monitor readings of the sensors, to determine tank conditions based on the sensor readings, and to send control signals to the illumination source. When the controller determines occurrence of a tank illumination condition based on the sensor readings, the controller sends control signals to the illumination source to illuminate the tank to indicate the tank illumination condition. The illumination source can be a light emitting diode (LED) assembly. The translucent tank can have a top furthest from the ground, and the in-tank illumination system can also include a bracket that connects the illumination source to the interior of the translucent tank at or near the top of the translucent tank. The translucent tank can be on a cart pulled by a vehicle and the controller can be located on the vehicle, then the in-tank illumination system can also include signal lines that connect the controller to the illumination source.

The controller can determine multiple different tank conditions based on the sensor readings. When the controller determines occurrence of a tank illumination condition which is one of the tank conditions, the controller determines the control signals associated with the tank illumination condition and sends the associated control signals to the illumination source to illuminate the tank to indicate the tank illumination condition. The illumination source can have multiple different illumination colors, and the associated control signals sent by the controller can include a color selection associated with the tank illumination condition. The illumination source can have a blink capability, and the associated control signals sent by the controller can include a blink selection associated with the tank illumination condition. The blink selection can indicate whether or not the illumination source should blink. The blink capability can include multiple blink patterns, and the associated control signals sent by the controller can include a pattern selection associated with the tank illumination condition.

The sensors can include a tank level sensor. When the controller determines a material level in the tank has crossed above a first upper level threshold based on the tank level sensor readings, the controller can send first level control signals to the illumination source that include a first level color selection and a first level blink selection. When the controller determines the material level in the tank has crossed below a first lower level threshold based on the tank level sensor readings, the controller can send second level control signals to the illumination source that include a second level color selection and a second level blink selection. The second level control signals can be different than the first level control signals. The controller can also determine when the material level in the tank has crossed above a second upper level threshold, and then send third level control signals to the illumination source that include a third level color selection and a third level blink selection. The controller can also determine when the material level in the tank has crossed below a second lower level threshold, and then send fourth level control signals to the illumination source that include a fourth level color selection and a fourth level blink selection. The third level control signals can be different than the first and second level control signals, and the fourth level control signals can be different than the first, second and third level control signals.

The sensors can include a tank pressure sensor, and when the controller determines a pressure in the tank has crossed a pressure threshold based on the pressure sensor readings, the controller can send pressure control signals to the illumination source that include a pressure color selection and a pressure blink selection to indicate that the pressure in the tank has crossed the pressure threshold. The sensors can include a tank weight sensor, and when the controller determines a weight in the tank has crossed a weight threshold based on the tank weight sensor readings, the controller can send weight control signals to the illumination source that include a weight color selection and a weight blink selection to indicate that the weight in the tank has crossed the weight threshold.

The sensors can include a flow meter sensor, and when the controller determines a flow in the tank has crossed a flow threshold based on the flow meter sensor readings, the controller can send flow control signals to the illumination source that include a flow color selection and a flow blink selection to indicate that the flow in the tank has crossed the flow threshold. The sensors can also include a flow meter motor sensor, and when the controller determines a clog in the tank based on the flow meter motor sensor readings, the controller can send flow motor control signals to the illumination source regardless of the readings of the flow meter sensor, where the flow motor control signals include a flow motor color selection and a flow motor blink selection to indicate that the clog has occurred, and the flow motor control signals are different than the flow control signals.

An in-tank illumination method is disclosed for a translucent tank with one or more sensors, where the tank has an interior configured to hold material, and the sensors monitor conditions of the tank and the material. The in-tank illumination method includes monitoring sensor readings of the one or more sensors; determining when a tank illumination condition occurs based on the sensor readings; determining control signals associated with the tank illumination condition; and sending the associated control signals to an illumination source to illuminate the tank to indicate the tank illumination condition, where the illumination source is configured to illuminate the interior of the translucent tank such that the tank illumination is visible outside of the translucent tank.

First and second tank conditions can be detected contemporaneously based on the sensor readings, where both of the first and second tank conditions are potential tank illumination conditions, and each of the potential tank illumination conditions can have an associated condition priority. In this case; the determining control signals step can include determining which of the first and second tank conditions has a higher condition priority, and selecting the control signals associated with the tank condition with the higher condition priority.

The control signals can include a blink selection for the illumination source, where the blink selection indicates whether or not the illumination source should blink and any blink pattern. In this case, the determining when a tank illumination condition occurs step can include detecting when the sensor readings go beyond, above or below, a threshold; and the determining control signals associated with the tank illumination condition step can include determining how far the sensor readings are beyond the threshold, and determining the blink selection based on how far the sensor readings are beyond the threshold. Alternatively, in this case, the determining control signals associated with the tank illumination condition step can include determining how long the tank illumination condition has continued to occur, and determining the blink selection based on how long the tank illumination condition has continued to occur.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
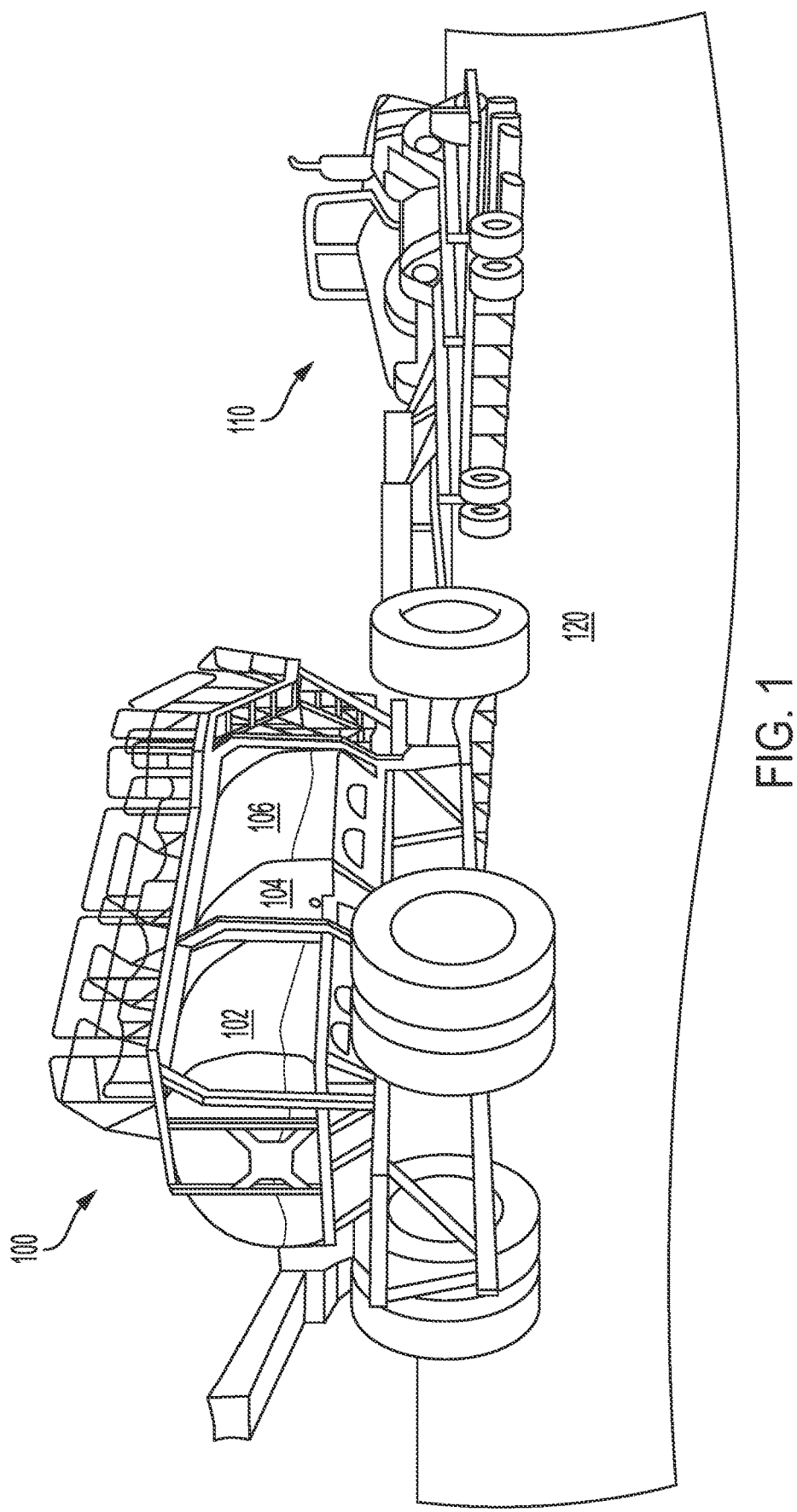
FIG. 1 illustrates an exemplary tank cart with an in-tank illumination system being pulled by a vehicle.

FIG. 1 illustrates an exemplary tank cart 100 with an in-tank illumination system being pulled by a vehicle 110 in a field 120. The tank cart 100 includes one or more tanks 102-106 that include tank illumination sources. Tanks are used in many applications to carry materials and it is often beneficial to know the level of material, pressure, flow or other parameters of a tank. Prior systems have implemented indicator lights on control panels or attached to the sides of the tanks to indicate relevant parameters. However, sometimes an operator or other interested party is not in a position to easily see these indicator lights even though they can see the tank itself. The tanks 102-106 are made of a translucent or transparent material so that an illumination source in the interior of the tank 102-106 can be seen by a vehicle operator, support crew or other interested party. The one or more tanks 102-106 can be on a cart as shown in FIG. 1, or can be on the vehicle 110 or can be stationary. Tank illumination systems can be used in various applications, for example and not limited to, air seeders, central fill planters, liquid sprayers, bailer treatment tanks, combines, tractor trailers, etc.

Figure 2:
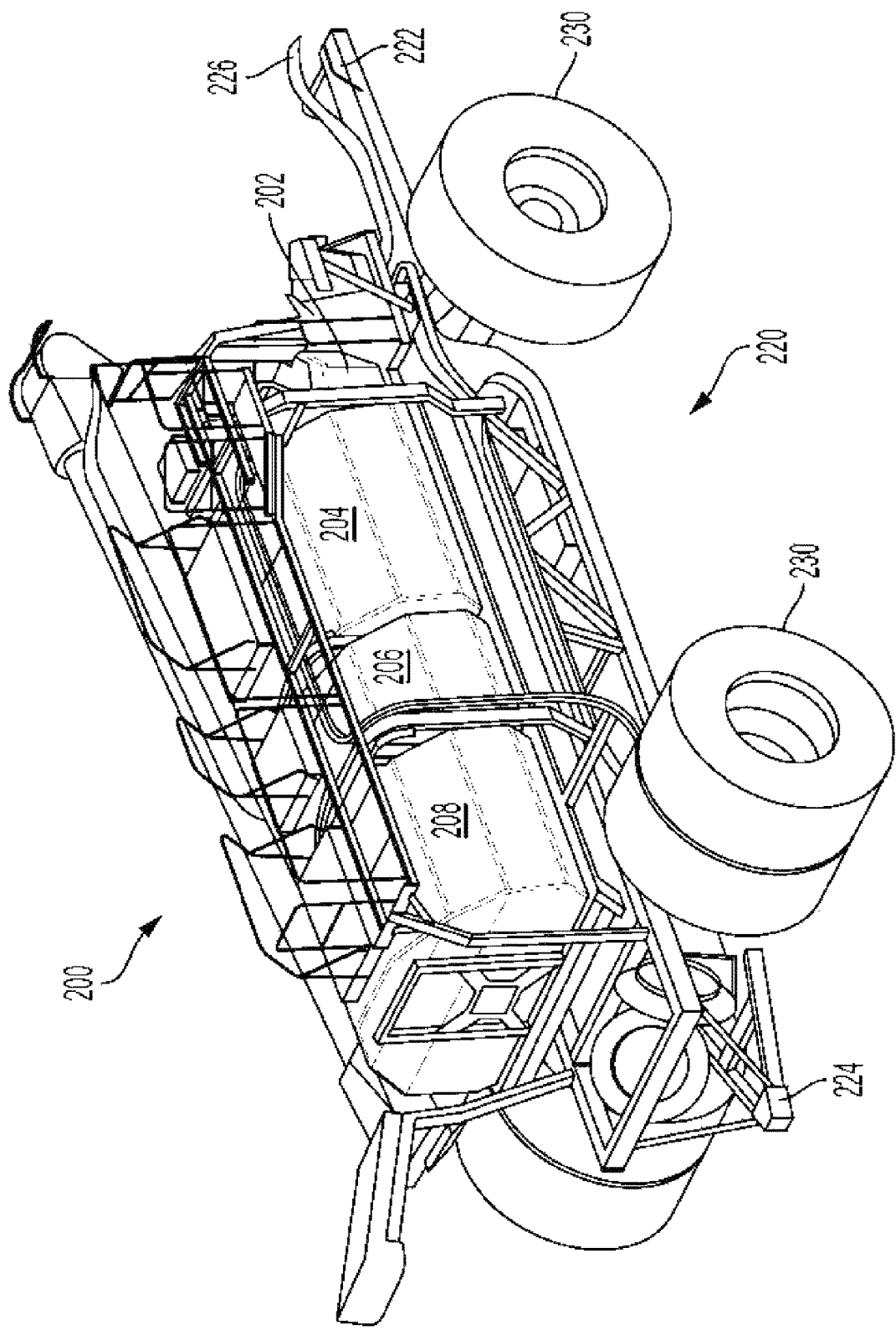
FIG. 2 illustrates an exemplary tank cart with four tanks that can each have an in-tank illumination system.

FIG. 2 illustrates an exemplary tank cart 200 with four tanks, a forward tank 202, a second tank 204, a third tank 206 and a rear tank 208. The tank cart 200 also includes a frame 220, a forward hitch 222, a rear hitch 224, connection lines 226 and traction devices 230, for example wheels, tracks, etc. The distal end of the forward hitch 222 and the proximal end of the rear hitch 224 are attached to the frame 220. The proximal end of the forward hitch 222 can be attached to a vehicle, for example the vehicle 110. The distal end of the rear hitch 224 can be attached to a trailing cart or other device. The connection lines 226 can connect power, electrical, hydraulic, and control systems between the tank cart 200 and the vehicle 110. There can also be connection lines between the tank cart 200 and any trailing device connected by the rear hitch 224. The traction devices 230 are attached to the frame 220 such that when the cart 200 is pulled/pushed or moved by a vehicle, the cart 200 moves on the traction devices 230. The tanks 202-208 are attached to the frame 220 and move with the cart 200. Each of the tanks 202-208 can include separate illumination devices and can be activated independently to show the conditions of each individual tank 202-208.

Figure 3:
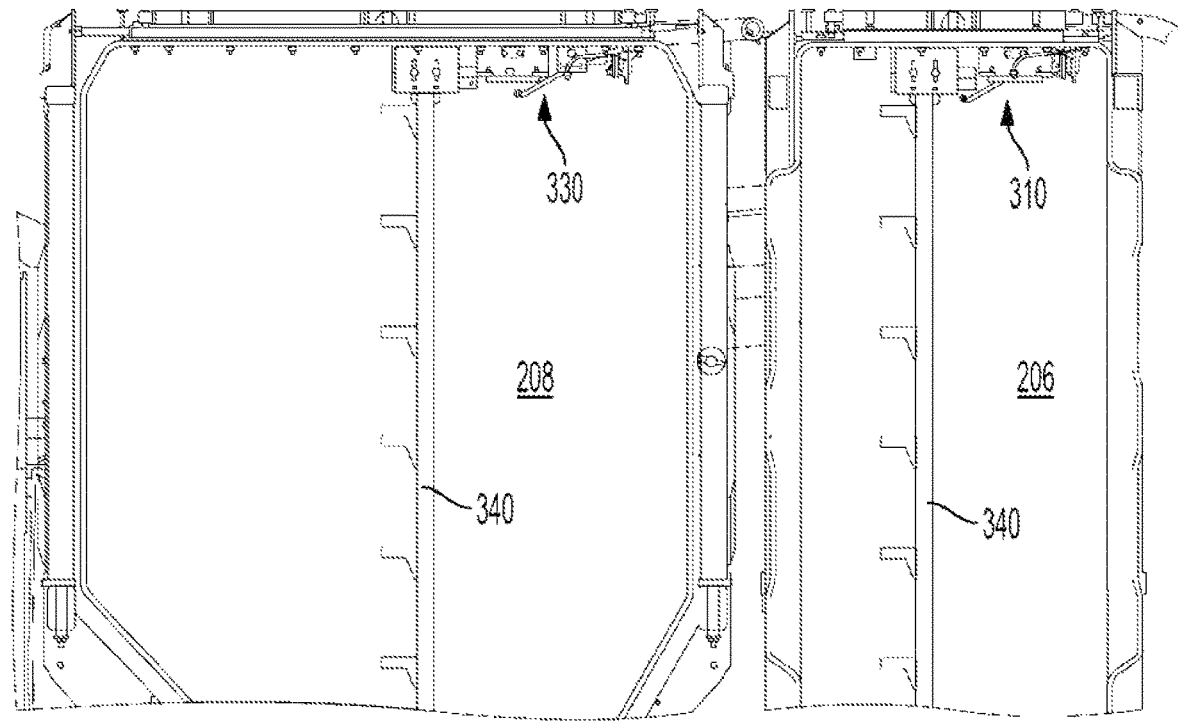
FIG. 3 illustrates a cross-section of the third and rear tanks of the tank cart shown in FIG. 2 to show the exemplary illumination systems in the tanks.
Figure 4:
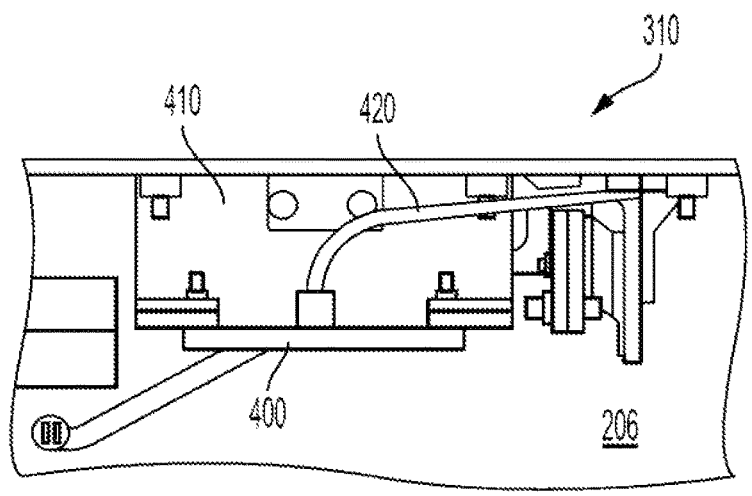
FIG. 4 illustrates a close up view of the exemplary illumination system in the third tank.

FIG. 3 illustrates a cross-section of the third tank 206 and the rear tank 208 of the tank cart 200 to show the interior of the tanks and exemplary illumination devices 310, 330 in tanks 206, 208, respectively. FIG. 4 illustrates a close up view of the exemplary illumination device 310 in tank 206. Each of the tanks 206, 208 can have various sensors, which can be the same or different, such as for example a level measuring sensor 340. The illumination device 310 includes a light source 400, a bracket 410, and power and signal lines 420. The light source 400 can be a light emitting diode (LED) light assembly, or other type of illumination source that can visibly light the tank so it is visible to a user through the tank exterior. The illumination device 310 can be mounted on the interior and at or near the top of the tank 206, and shine down on the contents of the tank 206. The bracket 410 connects the light source 400 to the interior of the tank 206. The power and signal lines 420 connect the light source 400 to a power source and an illumination controller that controls the light source 400. The power source and the illumination controller can be on the tank cart 200, or can be on the towing vehicle and connected through the connection lines 226.

Figure 5:
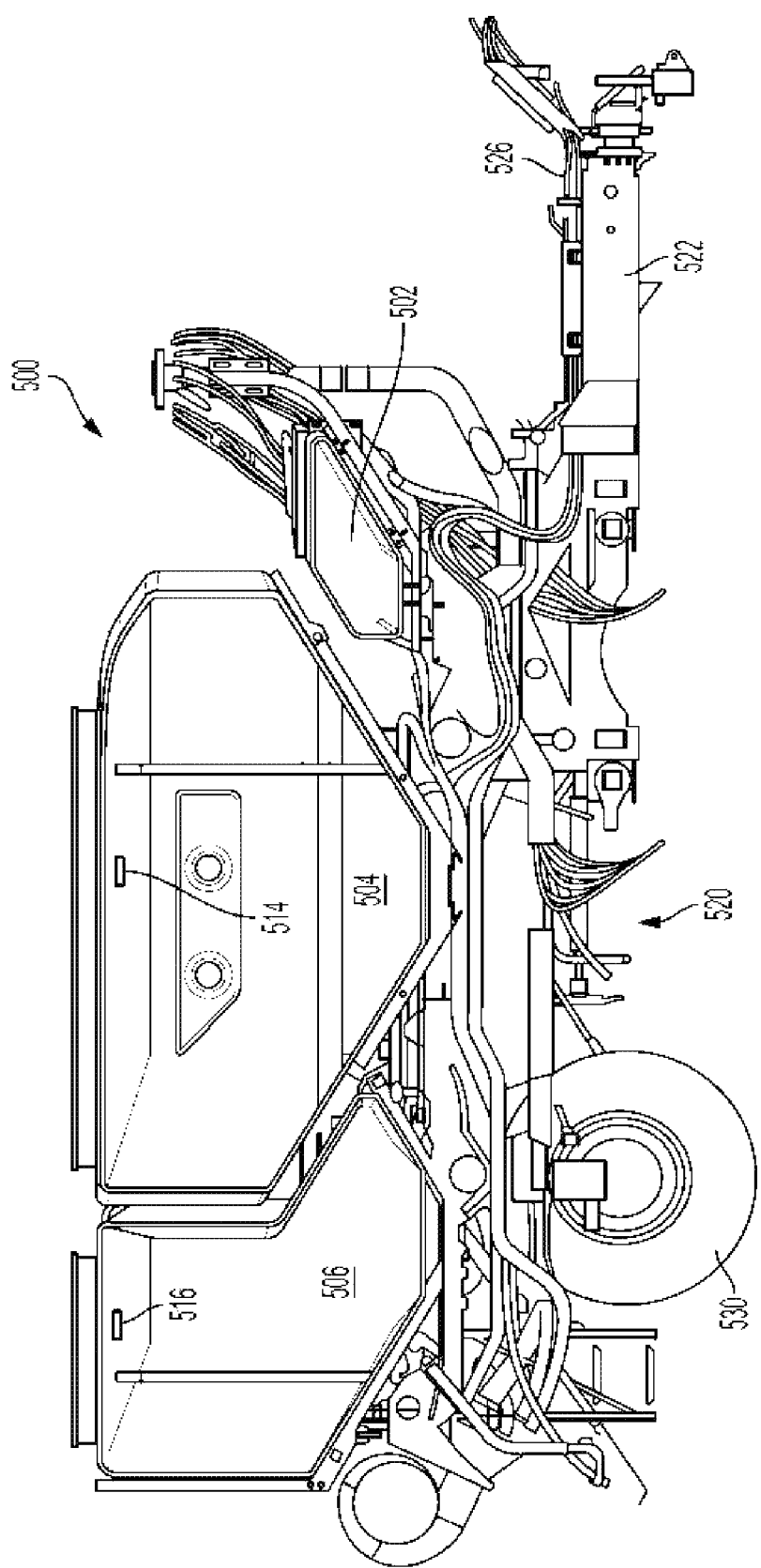
FIG. 5 illustrates a cross-section of an exemplary tank trailer with a forward tank, a center tank and a rear tank showing exemplary illumination systems in the center and rear tanks.

FIG. 5 illustrates a cross-section of an exemplary tank trailer 500 with three tanks, a forward tank 502, a center tank 504 and a rear tank 506. The cross-section shows that the interior of the center tank 504 includes an illumination device 514, and the interior of the rear tank 506 includes an illumination device 516. The tank trailer 500 also includes a frame 520, a forward hitch 522, connection lines 526 and traction devices 530. The distal end of the forward hitch 522 is attached to the frame 520, and the proximal end of the forward hitch 522 can be attached to a towing vehicle, for example the vehicle 110. The connection lines 526 can connect power, electrical, hydraulic, and control systems between the tank trailer 500 and the towing vehicle. The traction devices 530 are attached to the frame 520 such that when the trailer 500 is pulled/pushed or moved by a vehicle, the trailer 500 moves on the traction devices 530. The tanks 502-506 are attached to the frame 520 and move with the trailer 500. Each of the tanks 502-506 can include separate illumination devices that can be activated independently to show the conditions of each individual tank 502-506.

Figure 6:
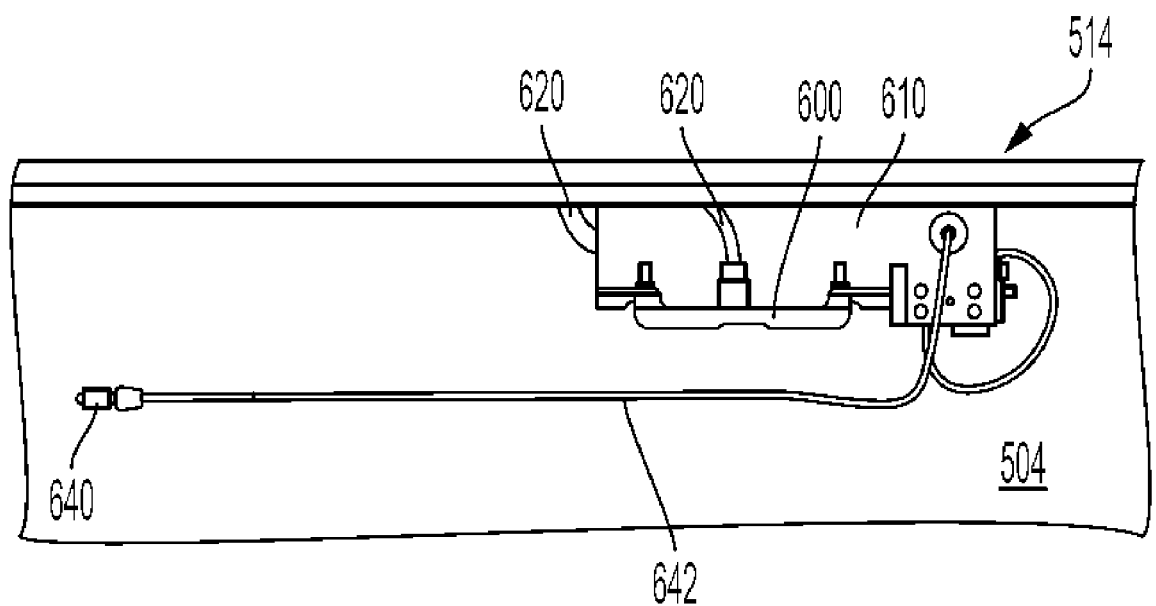
FIG. 6 illustrates a close up view of the exemplary illumination system in the center tank of the tank trailer shown in FIG. 5.

FIG. 6 illustrates a close up view of the illumination device 514 in tank 504. The illumination device 514 includes a light source 600, a bracket 610, and power and signal lines 620. The light source 600 can be a light emitting diode (LED) assembly, or other type of light assembly that can visibly light the tank 504 so it is visible to a user through the tank exterior. The bracket 610 connects the light source 600 to the interior of the tank 504. The power and signal lines 620 connect the light source 600 to a power source and an illumination controller that controls the light source 600. The power source and the illumination controller can be on the trailer 500, or can be on the towing vehicle and connected through the connection lines 526. The tank 504 can also have various sensors, such as for example a sensor 640 with sensor lines 642 that can connect the sensor 640 to the illumination controller or other controller.

Figure 7:
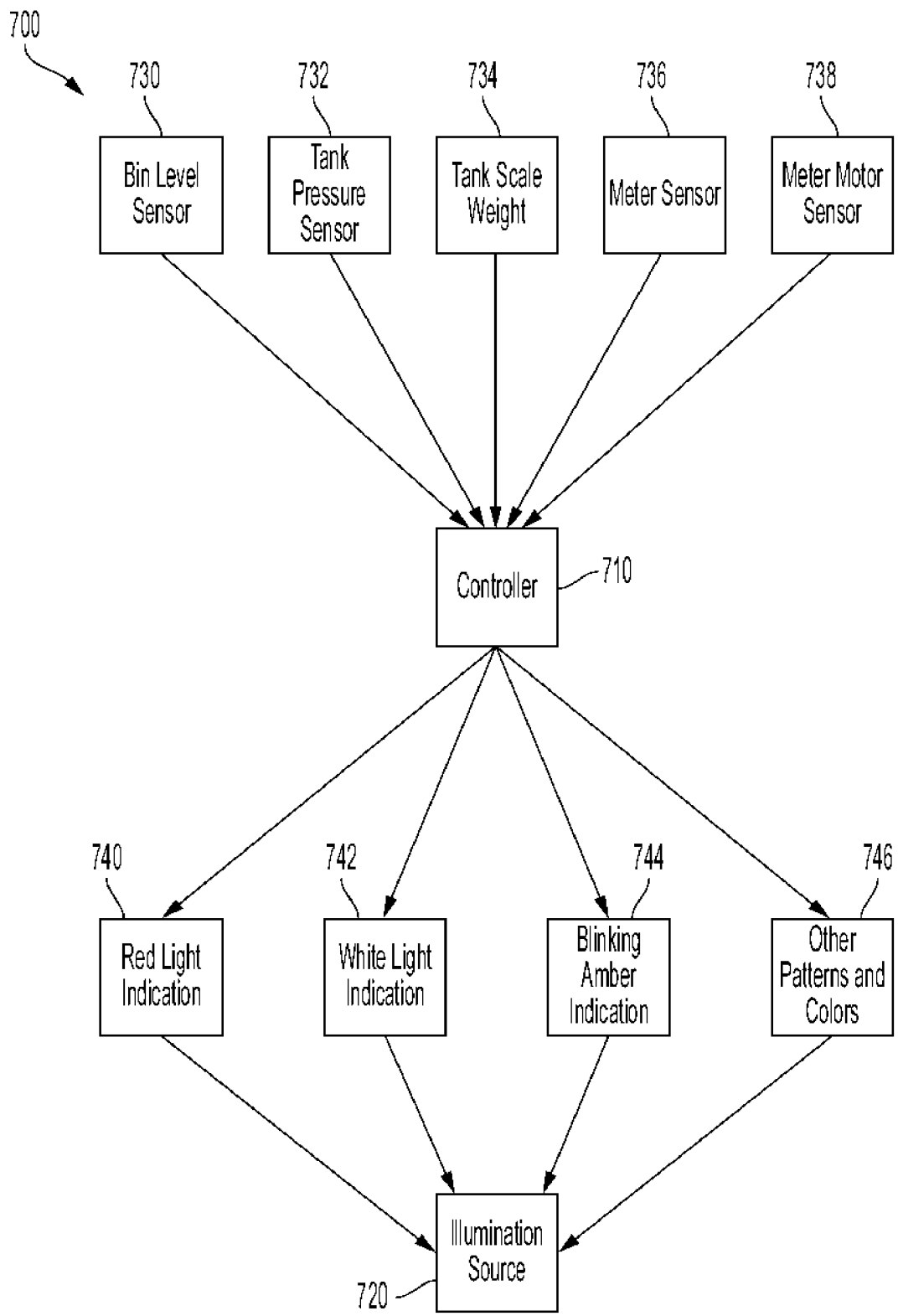
FIG. 7 illustrates a control diagram for an exemplary tank illumination system that includes a controller, an illumination source and several sensors that sense parameters in the tank and send their sensor readings to the controller.

FIG. 7 illustrates communication for an exemplary tank illumination system 700 that includes a controller 710, an illumination source 720 and several sensors 730-738. In this example, the sensors include a bin level sensor 730, a tank pressure sensor 732, a tank weight sensor 734, a meter sensor 736 and a meter motor sensor 738. The sensors 730-738 sense their parameters in the tank and their sensor readings are monitored by the controller 710. The controller 710 determines if any one or combination of sensor readings indicates a tank illumination condition or change of state that is to be indicated by the illumination source 720. If a sensed tank illumination condition is to be indicated by the illumination source 720, then the controller 710 sends control signals to the illumination source 720. In this example, controller 710 can send commands to the illumination source 720 to turn on/off, select or change color, select or change brightness, select or change blink and/or flash frequency as well as other commands.

The tank illumination system 700 monitors one or more parameters of a tank, and when the tank illumination system 700 senses a tank illumination condition or change of state that is to be indicated by the illumination source 720, it activates the illumination source 720 to indicate the sensed tank illumination condition. Some examples of the control signals that can be sent from the controller 710 to the illumination source 720 are given below. If the bin level sensor 730 indicates that the level of material in the bin has crossed above or below a first threshold indicating time to refill or empty the bin, then a blinking amber indication signal 744 can be sent from the controller 710 to the illumination source 720. If the bin level sensor 730 indicates that the level of material in the bin has crossed above or below a second threshold indicating the bin is empty or full, then a red light indication signal 740 can be sent from the controller 710 to the illumination source 720. If the bin level sensor 730 indicates the level of material in the bin is at an acceptable level that does not require action, then a white light indication signal 742 can be sent from the controller 710 to the illumination source 720. If the tank pressure sensor 732 indicates that the pressure inside the tank is too high or too low, then a red light indication signal 740 can be sent from the controller 710 to the illumination source 720. If the tank weight sensor 734 indicates the weight of material inside the tank is too high or too low, then a blinking amber indication signal 744 can be sent from the controller 710 to the illumination source 720. If the meter sensor 736 indicates that the flow of material to/from the tank is too high or too low, then a blinking amber indication signal 744 can be sent from the controller 710 to the illumination source 720. If the meter motor sensor 738 indicates that the flow of material to/from the tank has stopped, then a red light indication signal 740 can be sent from the controller 710 to the illumination source 720. Other pattern and color signals 746 can be sent from the controller 710 to the illumination source 720 to indicate these and other tank illumination conditions. For example, different blink/flash frequencies or patterns can be used to indicate the sensor causing the illumination, or to indicate the severity of the problem. The illumination source 720 can have additional colors, for example green, orange, etc.

If there are multiple different tank illumination conditions with different illumination indications (for example different colors, patterns, brightness, etc.) and multiple tank illumination conditions occur contemporaneously, then the controller 710 can send control signals to the illumination source 720 to indicate a particular one of the tank illumination conditions or cycle through more than one of the tank illumination conditions. For example, the controller 710 can be configured to send control signals to the illumination source 720 to indicate only the first occurring of the multiple tank illumination conditions, or the last occurring of the multiple tank illumination conditions. Alternatively, each tank illumination condition can have a priority and the controller 710 can be configured to send control signals to the illumination source 720 to indicate only the highest priority of the multiple tank illumination conditions. For example, slow material flow can be given a lower priority than material flow stopped, and if both of these tank illumination conditions occur contemporaneously, then the controller 710 can be configured to send control signals to the illumination source 720 to indicate only the material flow stopped condition. Alternatively, the controller 710 can be configured to cycle through the control signals sent to the illumination source 720 to indicate each of the multiple tank illumination conditions for a certain period of time. These and other alternatives and combinations thereof can be used to indicate multiple tank illumination conditions that occur contemporaneously.

The illumination system 700 can vary the control signals sent from the controller 710 to the illumination source 720 based on a severity or duration of a tank illumination condition. As an example for severity, the tank illumination condition can be triggered when the sensor readings go beyond, above or below, a threshold; and the blinking frequency or brightness of the illumination source can be varied based on how far the sensor readings are beyond the threshold. For example, using the bin level sensor 730, when the level of material in the bin has crossed above or below a level threshold, then an amber indication signal can be sent to the illumination source 720 and as the level moves further beyond the level threshold the blinking frequency or brightness of the amber indication signal can be increased and as the level moves closer to the level threshold the blinking frequency or brightness of the amber indication signal can be decreased. As an example for duration, the duration of the tank illumination condition can be tracked from when it is initially triggered; and the blinking frequency or brightness of the illumination source can be increased based on how long the tank illumination condition has continued to occur. For example, using the meter sensor 736, the tank illumination condition is initially triggered when the flow of material to/from the tank is too high or too low, at which point a red indication signal can be sent to the illumination source 720, and the blinking frequency or brightness of the red indication signal can be increased the longer the tank illumination condition based on the meter sensor 736 continues to occur.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An in-tank illumination system for a translucent tank with one or more sensors; the translucent tank having an interior configured to hold material, and the one or more sensors configured to monitor conditions of the translucent tank and the material, the in-tank illumination system comprising:
   an illumination source located in the interior of the translucent tank where the material is to be held, and the illumination source is configured to illuminate the interior of the translucent tank such that the tank illumination is visible outside of the translucent tank;
   a controller configured to monitor sensor readings of the one or more sensors, to determine a plurality of tank conditions based on the sensor readings, and to send control signals to the illumination source;
   wherein when the controller determines occurrence of a tank illumination condition based on the sensor readings, the controller determines the control signals associated with the tank illumination condition and sends the associated control signals to the illumination source to illuminate the tank to indicate the tank illumination condition, the tank illumination condition being one of the plurality of tank conditions;
   wherein the one or more sensors include a flow meter sensor;
   wherein when the controller determines a flow in the tank has crossed a flow threshold based on the readings of the flow meter sensor, the controller sends flow control signals to illuminate the illumination source to indicate that the flow in the tank has crossed beyond the flow threshold.

2. The in-tank illumination system of claim 1, wherein the translucent tank is located on a cart configured to be pulled by a vehicle; and
   the in-tank illumination system further comprises signal lines that connect the controller to the illumination source, wherein the controller is located on the vehicle and the controller sends control signals to the illumination source over the signal lines.

3. The in-tank illumination system of claim 1, wherein the illumination source has a plurality of potential illumination colors, and the associated control signals sent by the controller include a color selection of the plurality of potential illumination colors, the color selection associated with the tank illumination condition; and
   wherein the illumination source has a blink capability, and the associated control signals sent by the controller include a blink selection associated with the tank illumination condition, wherein the blink selection indicates whether or not the illumination source should blink and any blink pattern to indicate the tank illumination condition.

4. The in-tank illumination system of claim 3, wherein the illumination source is a light emitting diode (LED) assembly.

5. The in-tank illumination system of claim 3, wherein the one or more sensors include a tank level sensor located in the interior of the translucent tank where the material is to be held;
   wherein when the controller determines a material level in the tank has crossed above a first upper level threshold based on the readings of the tank level sensor, the controller sends first level control signals to the illumination source that include a first level color selection and a first level blink selection; and when the controller determines the material level in the tank has crossed below a first lower level threshold based on the readings of the tank level sensor, the controller sends second level control signals to the illumination source that include a second level color selection and a second level blink selection, where the second level control signals are different than the first level control signals.

6. The in-tank illumination system of claim 3, wherein the one or more sensors include a tank pressure sensor;
   wherein when the controller determines a pressure in the tank has crossed a pressure threshold based on the readings of the tank pressure sensor, the controller sends pressure control signals to the illumination source that include a pressure color selection and a pressure blink selection to indicate that the pressure in the tank has crossed the pressure threshold.

7. The in-tank illumination system of claim 3, wherein the one or more sensors include a tank weight sensor;
   wherein when the controller determines a weight in the tank has crossed a weight threshold based on the readings of the tank weight sensor, the controller sends weight control signals to the illumination source that include a weight color selection and a weight blink selection to indicate that the weight in the tank has crossed the weight threshold.

8. The in-tank illumination system of claim 1, wherein the one or more sensors include a flow meter motor sensor;
   wherein when the controller determines a clog in the tank based on the readings of the flow meter motor sensor, the controller sends flow motor control signals to the illumination source regardless of the readings of the flow meter sensor, where the flow motor control signals include a flow motor color selection and a flow motor blink selection to indicate that the clog has occurred, and the flow motor control signals are different than the flow control signals.

9. The in-tank illumination system of claim 1, wherein the illumination source has a plurality of potential illumination colors, and when the controller determines the flow in the tank has crossed the flow threshold based on the readings of the flow meter sensor, the flow control signals include a color selection of the plurality of potential illumination colors to indicate that the flow in the tank has crossed beyond the flow threshold.

10. The in-tank illumination system of claim 1, wherein the illumination source has a blink capability, and when the controller determines the flow in the tank has crossed the flow threshold based on the readings of the flow meter sensor, the flow control signals include a flow blink frequency for the illumination source where the flow blink frequency is varied based on how much the flow in the tank has crossed beyond the flow threshold.

11. The in-tank illumination system of claim 1, wherein the illumination source has a blink capability, and when the controller determines the flow in the tank has crossed the flow threshold based on the readings of the flow meter sensor, the flow control signals include a flow blink frequency for the illumination source where the flow blink frequency is varied based on how long the flow in the tank has continued to be beyond the flow threshold.

* * * * *